United States Patent [19]
Arvidsson

[11] Patent Number: 5,366,195
[45] Date of Patent: Nov. 22, 1994

[54] ARRANGEMENT IN A LOAD CARRIER

[75] Inventor: Jan-Ivar Arvidsson, Hillerstorp, Sweden

[73] Assignee: Industri AB Thule, Sweden

[21] Appl. No.: 942,197

[22] Filed: Sep. 9, 1992

[30] Foreign Application Priority Data

Sep. 9, 1991 [SE] Sweden ............................ 9102584-1

[51] Int. Cl.5 ...................... B60R 9/052; B60R 9/058
[52] U.S. Cl. .................................. 248/231.3; 224/315; 224/331
[58] Field of Search ................ 248/231.3, 499, 225.31; 224/315, 320, 331

[56] References Cited

U.S. PATENT DOCUMENTS

| | | | |
|---|---|---|---|
| 2,739,748 | 3/1956 | Hoover | 248/231.3 X |
| 2,983,414 | 5/1961 | Fehr | 224/331 |
| 3,920,167 | 11/1975 | Parsons | 224/331 |
| 4,752,022 | 6/1988 | Thulin | 224/331 X |

FOREIGN PATENT DOCUMENTS

| | | |
|---|---|---|
| 0091889 | 10/1983 | European Pat. Off. . |
| 0331106 | 9/1989 | European Pat. Off. . |
| 2504472 | 10/1982 | France . |
| 2559110 | 8/1985 | France . |
| 2740522 | 3/1979 | Germany . |
| 3415903 | 10/1985 | Germany . |
| 3626479 | 2/1988 | Germany . |
| 3826647 | 11/1989 | Germany . |
| 429027 | 8/1983 | Sweden . |
| 446521 | 9/1986 | Sweden . |
| 450561 | 7/1987 | Sweden . |

*Primary Examiner*—Rinaldi I. Rada
*Attorney, Agent, or Firm*—Burns, Doane, Swecker & Mathis

[57] ABSTRACT

The present invention relates to a device for affixing a load-bearing element to the roof of a vehicle such that the load-bearing element extends transversely over the roof. The device has a supporting and fixing element for engaging the vehicle. A contact support member is generally rigidly attached to an end part of the load-bearing element and extends downward from the element. The supporting and fixing element is swingably attached to the load-bearing element or the contact support member such that the lower end of the supporting and fixing element can be moved toward or away from the longitudinal center line of the vehicle. A clamping device is disposed on the contact support member and, in an activated locked position of the clamping device, the clamping device presses the lower part of the supporting and fixing element into locking engagement with a holding arrangement of the vehicle. In the open position of the clamping device, the clamping device frees the supporting and fixing element so that the lower part of the element can be swung out of engagement with the vehicle.

32 Claims, 4 Drawing Sheets

ARRANGEMENT IN A LOAD CARRIER

AREA OF TECHNOLOGY

The invention relates to a device with a foot for a load-beating element, which device is intended for use in the lateral edge region of the roof (7) of a vehicle for affixing a load-bearing element (1) which extends transversely to the longitudinal direction of the vehicle, and which device has a single supporting and fixing element (4) which can be anchored to the vehicle.

STATE OF THE ART

Load-bearing elements of the above-described type are used principally on vehicles which have specially formed holding means for such elements. These holding means may be anchored to rails or racks on the roof of the vehicle or to narrow recesses in and behind the edge parts of the doors of the vehicle. Often the foot members used with the load-bearing elements are affixed by means of complex mechanisms or screw means.

UNDERLYING PROBLEM OF THE INVENTION

It is an object of the present invention to devise a device of the type described initially above which provides a means of quickly and conveniently mounting and demounting load-bearing members, and also provides excellent stability. It is a further object of the invention to devise a device which is simple and inexpensive to manufacture and which can be designed to be aesthetically attractive as well as theft preventive.

SOLUTION TO THE UNDERLYING PROBLEM OF THE INVENTION

The problem is solved by a device of the type described initially above which is characterized in that a contact support member is provided which extends downward from the region of the load-bearing element which member is provided for implementing the foot device, wherewith said support member is generally rigid with respect to the loading-bearing element; further in that the upper end part of the supporting and fixing element is swingably attached to the load-bearing element or to the contact support member, wherewith the pivot pin for the supporting and fixing member is generally parallel to the longitudinal direction of the vehicle; and in that a clamping device is disposed on the contact support member which clamping device in its activated, locked position presses the lower part of the supporting and fixing element into locking engagement with holding organs disposed in or on the vehicle, and which in its open position frees the supporting and fixing dement so that the lower part of the latter is swingable so as to disengage from the vehicle.

According to a particular embodiment of the invention, the contact support member extends from a downwardly bent or curved end part of the load-bearing member.

According to another embodiment of the invention, the contact support member extends into the end part of the load-bearing member and is affixed in said end part by means of an affixing organ which also serves as a pivot pin for swinging movement of the supporting and fixing element.

Additional advantages of the invention are apparent from the specification and one or more of the features of the claims.

SUMMARY DESCRIPTION OF THE DRAWINGS

The invention will be described in more detail hereinbelow with reference to the accompanying drawings.

DETAILED DESCRIPTION OF THE PREFERRED EMBODIMENTS

Figure 1:
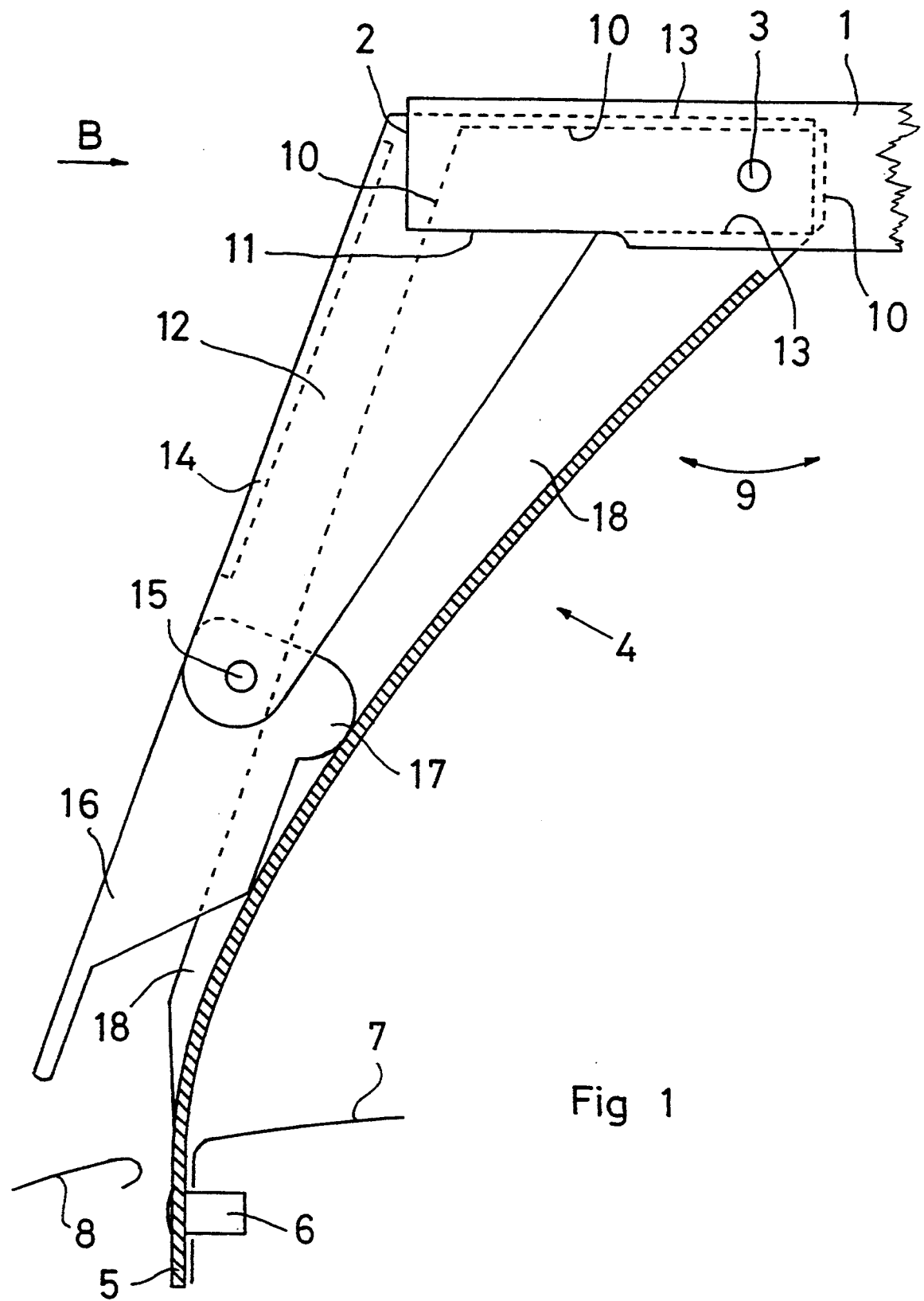
FIG. 1 is a lateral, partial cross sectional view along the line ("cut marks") 1—1 of FIG. 2, of a foot for a load-bearing element, and a corresponding load-bearing element fixed in said foot.

The load-bearing element 1 of FIG. 1 advantageously comprises a rectangular beam which extends over the top of a vehicle transversely to the longitudinal direction of the vehicle. On the opposite end of beam 1 (not shown in the figure) there is disposed a second foot for a load-bearing element, which foot is of the same type as shown in FIG. 1. This other foot may alternatively have a different structure, which may be stiff and may have no tubular parts.

At a distance from an end 2 of the beam 1 shown in FIG. 1 there is disposed a pivot pin 3 which, when the beam is mounted on the vehicle, is oriented generally horizontally and generally parallel to the longitudinal axis of the vehicle. A supporting and fixing element 4 is swingably mounted to the pin 3.

A lower end of element 4 bears a fixing member 5 with an engaging member 6 which is intended to cooperate with a corresponding member (not shown in the drawings) in the body of the vehicle. In the embodiment illustrated, the engaging members 6 can be in the form of pins which extend horizontally into corresponding openings in the vehicle body. The roof 7 of the vehicle may be seen in the Figure, with the vehicle door 8 which closes close to the roof.

Figure 2:
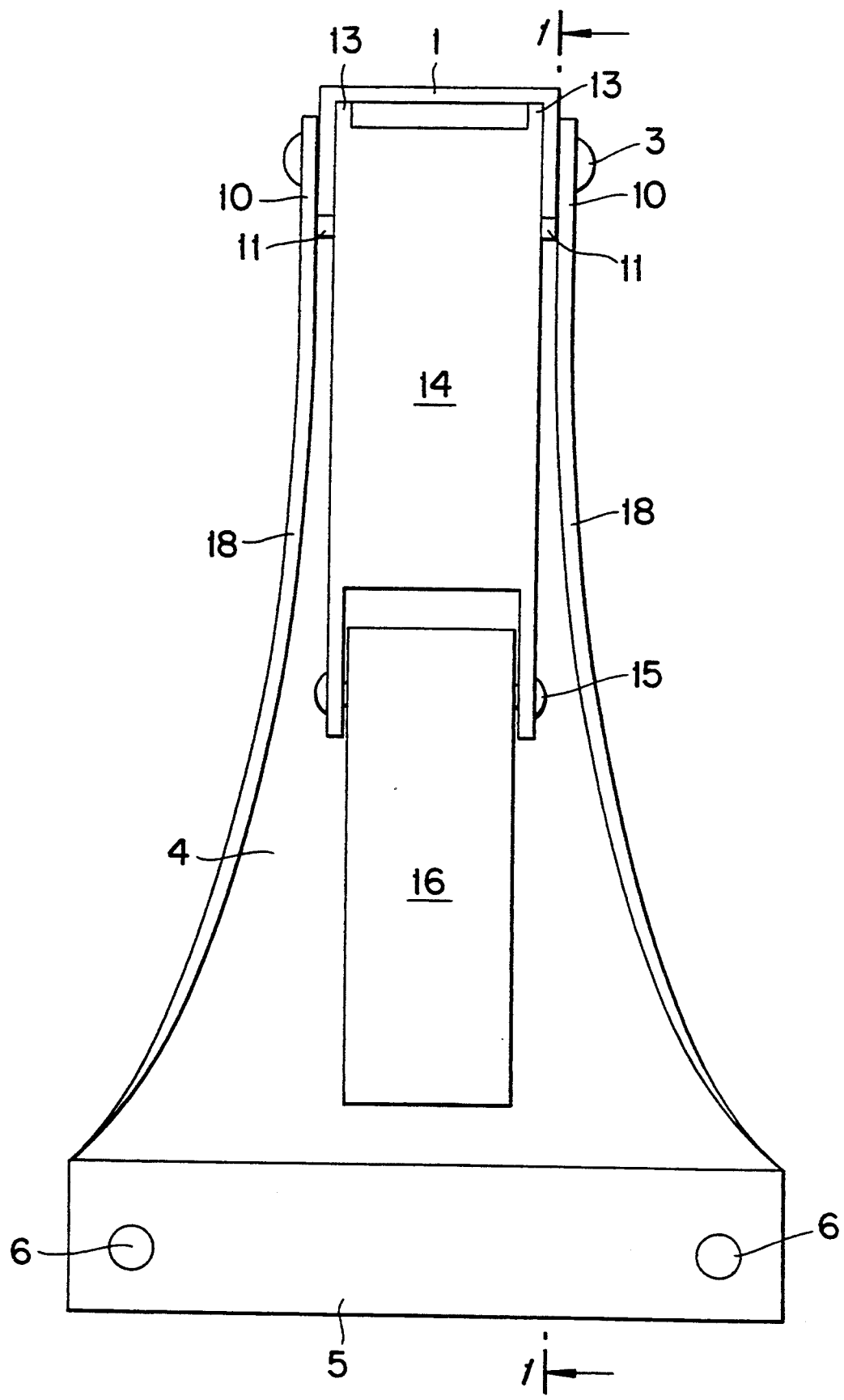
FIG. 2 is a view of the foot for a load-bearing element in the direction of arrow B of FIG. 1.

The supporting and fixing element 4 extends out from the beam 1 and, as mentioned supra, is pivotably attached by the pivot pin 3 so that swinging according to arrow 9 can occur. It is seen from the Figure that the supporting and fixing element 4 has an upper part of the boundary of which is designated 10. This upper part is connected to the exterior surfaces (see FIG. 2) of the beam 1 such that the element 4 has good control of the beam 1.

The outermost part of the beam 1 has a recess 11 on its underside so that a cross section through the beam in the region of said recess has a U-shape with the opening being downward. A contact support member 12 is introduced through the opening formed by the recessed (cut away) part 11 and is fixed. Member 12 has inwardly directed lugs the edges of which are indicated by the dotted lines 13 in FIG. 1. These lugs extend into the beam 1 past the open part 11 and at least far enough to be fixed to the beam by means of the pivot pin 3 which also serves to affix the supporting and fixing element 4. The lugs extend with good fit into the tubular beam 1, thereby fixing the position of the contact support member 12 so that the support member is generally rigid with respect to the beam 1.

In a horizontal cross section immediately below the beam 1, the contact support member 12 has a U-shape in that it is closed off by means of a web member 14 shown in dotted lines in FIG. 1.

The lower end part of the contact support member 12 bears a pivot pin 15 which serves to pivotably affix a maneuvering arm 16 having an eccentric member 17. The arm 16 and eccentric 17 combine to form a clamping device which, as shown in the operative position of FIG. 1, holds the supporting and fixing element 4 pressed in the rightward direction (FIG. 1) to urge a secure engagement between the engaging member 6 of element 4 and the corresponding engaging organ in the vehicle body. Pivoting of the maneuvering arm 16 by about 90° in the clockwise direction frees the supporting and fixing element 4 such that the lower fixing part 5 of said element 4 can be swung clockwise away from the middle of the vehicle body, whereby the engaging member 6 comes free from the corresponding engaging organ in the vehicle body.

The eccentric member 17 has a self-locking shape, wherewith when the maneuvering arm 16 is swung in the opening clockwise direction there is first an increase in the pressing force of the eccentric member against the contact support member 12 before the latter is freed. This configuration eliminates a need for special locking of the maneuvering arm, but instead the arm 16 is self-locking.

In order for the inventive device to be able to withstand large loads in the longitudinal direction of beam 1, the supporting and fixing element 4 has lateral flange members 18 which constitute downward extensions of the upper parts 10. In this way, the supporting and fixing element 4 becomes U-shaped in horizontal cross section at an elevation somewhere along the contact support member 12, with the web member of said element 4 facing (i.e., nearest to) the center line of the vehicle.

Figure 3:
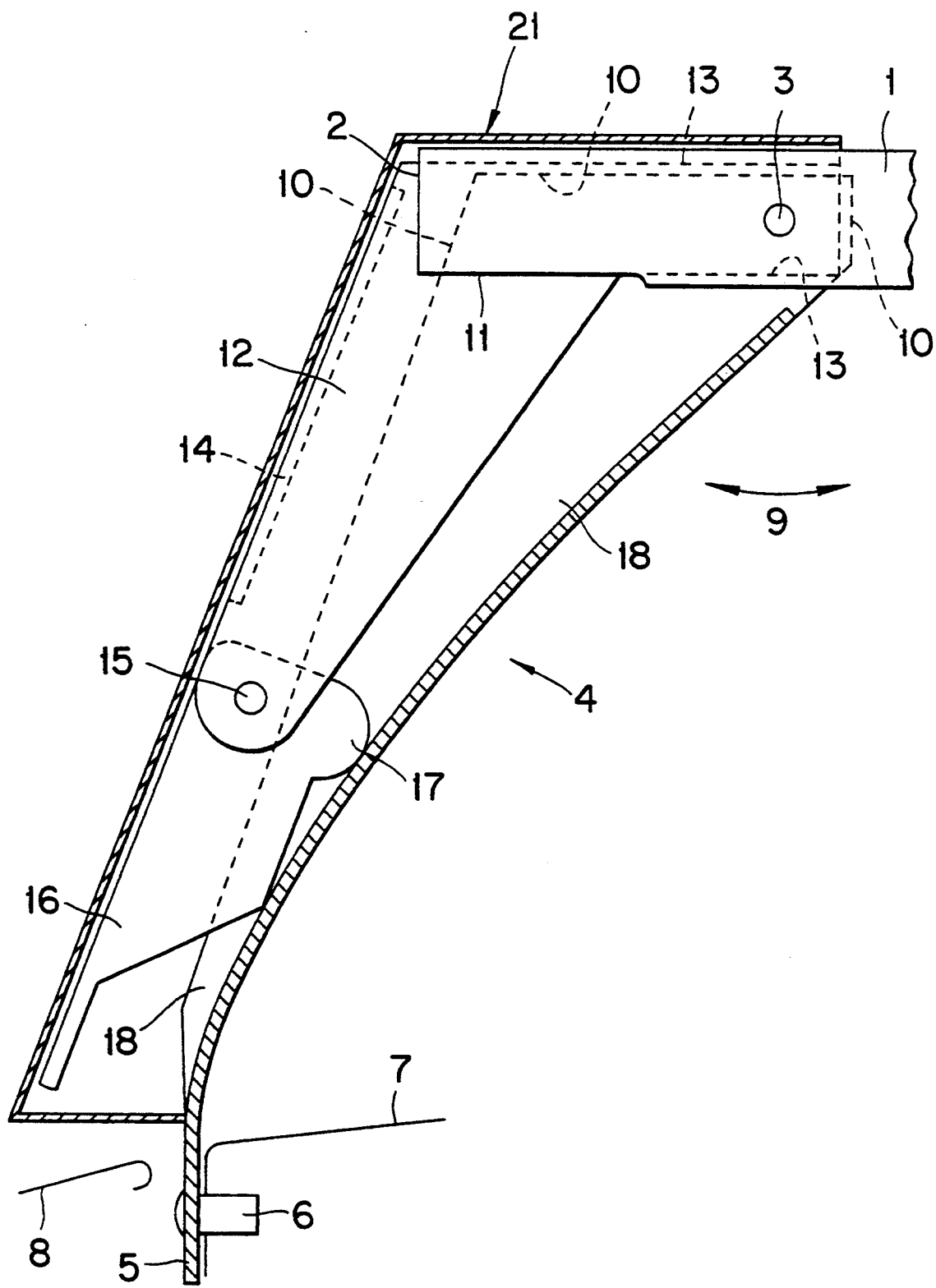
FIG. 3 is a view similar to FIG. 1 including a cross-section of a portion of a protective cover.

It is advantageous if the inventive foot for a load-bearing element has a lockable protective cover 21 (partially shown in cross-section in FIG. 3) disposed on the left side as seen in FIG. 3, extending over the supporting and fixing element 4. Said cover may have a form which attaches to the lateral flange members 18 of element 4. The deep dimension of the cover 21 in the horizontal direction, (i.e., in the longitudinal direction of the beam 1, is large enough so that the cover, when in its closed position, encloses the contact support member 12 and at least a large enough portion of the maneuvering arm 16 that the arm is hindered in being swung clockwise toward its open position). The protective cover may thus be regarded as a direct continuation of the lateral flange members 18 of the supporting and fixing element 4 in the leftward direction in FIG. 1. The only deviation which is advantageous to have from this is in the upper part of the cover where it may be configured so as to delimit (in the manner of a yoke) the load-bearing beam 1 and the upper part 10 of the supporting and fixing element 4 which upper part lies outside the beam 1.

With this configuration, the cover can advantageously be pivotably affixed to the same pivot pin 3 which is used for attaching the lugs 13 and the supporting and fixing element 4.

The above-described cover is advantageously lockable to the contact support member 12, e.g., by means of a key lock which form-interlockingly engages in a suitably shaped opening in the web member 14 of the contact support member. When the cover is securely locked to the contact support member, it is not possible to swing the maneuvering arm 16 in the opening direction. Only after the key lock is opened and the cover is swung in the clockwise direction upward can be maneuvering arm 16 be manipulated to release the clamping device.

According to the invention it is also possible for the contact support member 12 to be configured such that it exteriorly borders the end part of the beam 1. With such an embodiment, the lateral flanges of the supporting and fixing element 4 may be disposed next to the vertical exterior part of the beam 1, and the corresponding parts of the contact support member 12 may also be disposed next to said vertical exterior part.

It is also possible for the upper end part of the supporting and fixing element 4 to be somewhat narrower, so that it can be accommodated internally in the beam 1, wherewith the beam 1 has a larger cut-out part 11.

According to the invention it is also possible for the maneuvering arm 16 to be configured such that it surrounds and delimits (in the manner of a yoke) the contact support member 12. With such an embodiment, the maneuvering arm may be directed upward along the web member 14 of the contact support member 12 in the closed position, wherewith to bring it to the open position, it is swung counterclockwise. With this embodiment it is advantageous for the maneuvering arm to have an opening in it to allow the lock of the cover to extend through said opening where the lock can form-interlockingly engage the web member 14 of the contact support member 12.

Figure 4:
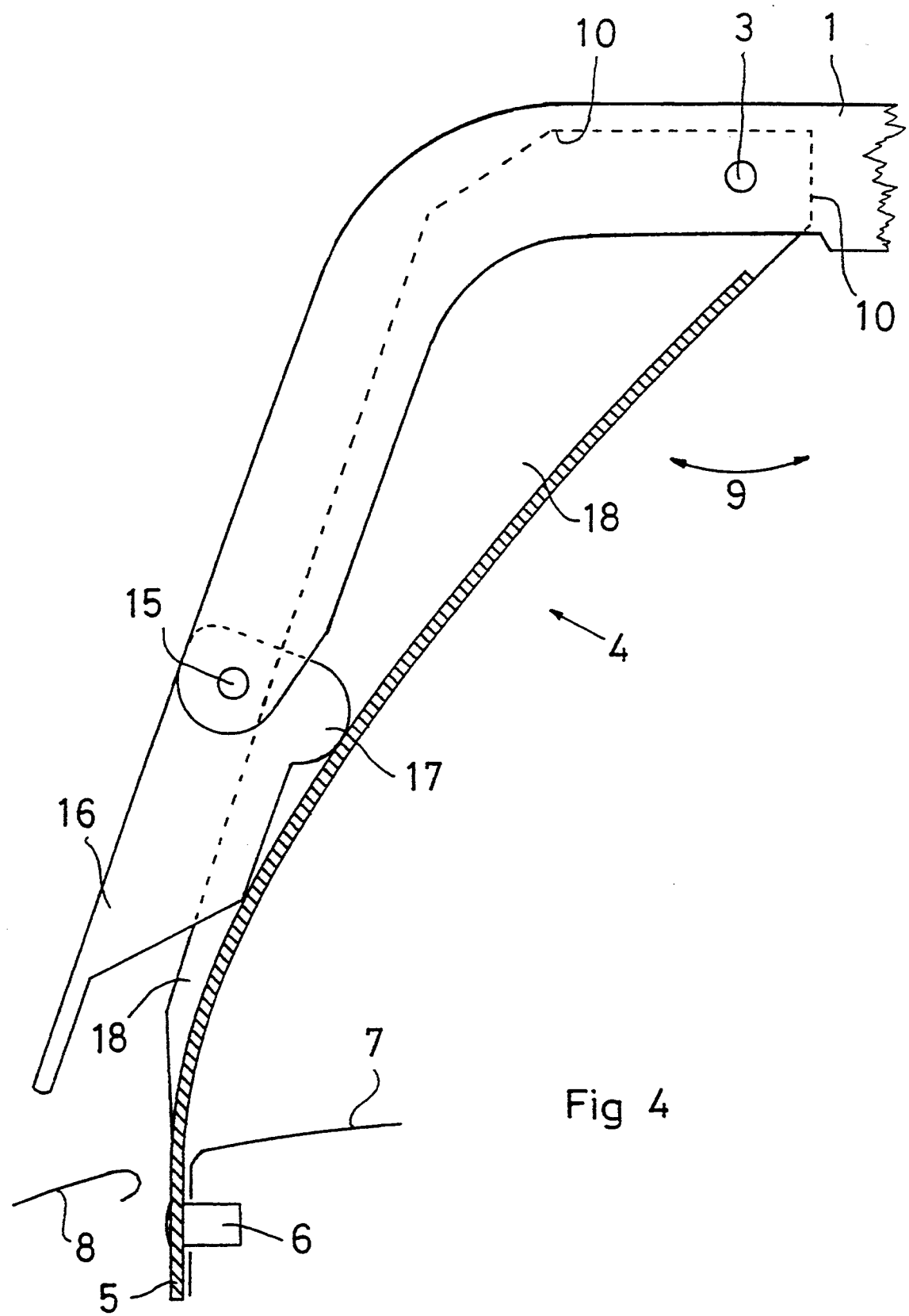
FIG. 4 is a view similar to FIG. 3 including an alternate embodiment.

As shown in FIG. 4, the invention also provides for an embodiment where the contact support member 12 is manufactured in a single unit with the load-bearing beam. A simple way of achieving such an embodiment is by bending or curving the two opposite end parts of the load-bearing beam downward such that the bent-down parts can bear the pivot pin 15 used for the swingable attachment of the clamping means, i.e., the maneuvering arm 16 with eccentrics 17.

The clamping means described above are extremely fast and convenient to use, and provide good clamping force. However, it is possible to replace these with, e.g., screw means which press the supporting and fixing element 4 inward against the vehicle.

Alternatively, the clamping organ or maneuvering arm 16 may be disposed on the tubular fixing element 4, wherewith said clamping organ or arm presses outward against the contact support member 12.

To make the device according to the invention more universally applicable, it is possible to dispose the engaging organ 6 in movable or replaceable fashion on the fixing part 5 so that the position and/or attitude or structure of said engaging organ can be adjusted to the body of the vehicle.

According to the invention it is also possible to configure the transverse load-bearing element 1 such that its length is adjustable, e.g., by means of a telescoping mechanism, to facilitate installation and/or to enable adjustment to a variety of vehicle bodies. Alternatively, it is possible to provide the supporting and fixing element 4 and the contact support member 12 in a single unit, which can be adjusted to various positions along the load-bearing element 1.

Possibly the adjustability can be an alternative to clamping organs for maneuvering the supporting and fixing element 4.

Further variants of the invention are possible within the scope of the claims.

I claim:

1. A device for affixing a load-bearing element to a roof of a vehicle, the load-bearing element extending transversely to a longitudinal direction of the vehicle, the device comprising:

a supporting and fixing element to be anchored to the vehicle;

a contact support member extending downward from a region of the load-bearing element, said contact support member being generally rigid with respect to the load-bearing element;

a pivot pin attached to at least one of the load-bearing element and the contact support member, an upper part of the supporting and fixing element being swingably attached to at least one of the load-bearing element and the contact support member about the pivot pin, the pivot pin being generally parallel to the longitudinal direction of the vehicle;

a clamping device disposed on the contact support member, the clamping device including a single actuator movable to a locked position to press a lower part of the supporting and fixing element into locking engagement with holding members on the vehicle, and the actuator, in an open position, releasing the supporting and fixing element so that the lower part of the supporting and fixing element is swingable to disengage from the vehicle.

2. A device according to claim 1, wherein the upper part of the supporting and fixing element is adjacent one of the load-bearing element and the contact support member.

3. A device according to claim 2, wherein the contact support member extends from a downwardly curved end part of the load-bearing element.

4. A device according to claim 2, wherein the upper part of the supporting and fixing element is connected to exterior surfaces of the load-bearing element.

5. A device according to claim 1, further comprising a protective cover mounted so as to be swingable between a first position in which the cover prevents maneuvering of the clamping device, and a second position in which the cover is swung away from the contact support member so that the clamping device is maneuverable.

6. A device according to claim 5, wherein an upper part of the protective cover is disposed adjacent one of the load-bearing element and the contact support member.

7. A device according to claim 5, wherein the protective cover is swingably attached to the device by the pivot pin.

8. A device for affixing a load-bearing element to a roof of a vehicle, the load-bearing element extending transversely to a longitudinal direction of the vehicle, the device comprising:

a supporting and fixing element to be anchored to the vehicle;

a contact support member extending downward from a region of the load-bearing element, said contact support member being generally rigid with respect to the load-bearing element;

a pivot pin attached to at least one of the load-bearing element and the contact support member, an upper part of the supporting and fixing element being swingably attached to at least one of the load-bearing element and the contact support member about the pivot pin, the pivot pin being generally parallel to the longitudinal direction of the vehicle; and a clamping device disposed on the contact support member, the clamping device in a locked position pressing a lower part of the supporting and fixing element into locking engagement with holding members on the vehicle, and the clamping device in an open position releasing the supporting and fixing element so that the lower part of the supporting and fixing element is swingable to disengage from the vehicle, wherein the upper part of the supporting and fixing element is adjacent one of the load-bearing element and the contact support member and the contact support member extends into an end part of the load-bearing element and is affixed in said end part by affixing means, the affixing means including the pivot pin.

9. A device for affixing a load-bearing element to a roof of a vehicle, the load-bearing element extending transversely to a longitudinal direction of the vehicle, the device comprising:

a supporting and fixing element to be anchored to the vehicle:

a contact support member extending downward from a region of the load-bearing element, said contact support member being generally rigid with respect to the load-bearing element;

a pivot pin attached to at least one of the load-bearing element and the contact support member, an upper part of the supporting and fixing element being swingably attached to at least one of the load-bearing element and the contact support member about the pivot pin, the pivot pin being generally parallel to the longitudinal direction of the vehicle;

a clamping device disposed on the contact support member, the clamping device in a locked position pressing a lower part of the supporting and fixing element into locking engagement with holding members on the vehicle, and the clamping device in an open position releasing the supporting and fixing element so that the lower part of the supporting and fixing element is swingable to disengage from the vehicle, the clamping device including an eccentric locking member.

10. A foot device for a load carrier, the load carrier including a carrier member extending transversely over a roof of a vehicle, at least one end of the carrier member being fastened to the vehicle by the foot device, the foot device comprising:

a contact support member extending downwardly from an end of the carrier member, the contact support member being substantially rigid relative to the carrier member;

a supporting and fixing element including, at a lower end portion thereof, engagement means for engaging with corresponding engagement means on the vehicle, the supporting and fixing element including, at an upper portion thereof, pivotal connection means for pivotably connecting the supporting and fixing element to at least one of the carrier member and the contact support member such that the supporting and fixing element is pivotable about a substantially horizontal pivot axis that is substantially parallel relative to a longitudinal direction of the vehicle;

a clamping device on the contact support member, the clamping device including a single actuator for forcing the supporting and fixing element to pivot to a locking position in which the engagement means of the supporting and fixing element engages with the corresponding engagement means on the vehicle and fastens the load carrier to the vehicle, and for releasing the supporting and fixing element and allowing the supporting and fixing element to pivot to an open position in which the engagement means of the supporting and fixing element disengages from the corresponding engagement means on the vehicle.

11. The load carrier of claim 10, wherein the upper portion of the supporting and fixing element is adjacent exterior surfaces of an end portion of the carrier member.

12. The load carrier of claim 11, wherein the contact support member is an integral, downwardly bent end portion of the carrier member.

13. The load carrier of claim 11, wherein the contact support member includes an upper mounting portion received in an end portion of the carrier member.

14. The load carrier of claim 10, wherein the engagement means includes one or more protruding members disposed at the lower end portion of the supporting and fixing element and extending substantially horizontally toward the vehicle, and wherein the corresponding engagement means includes corresponding openings on the vehicle for receiving the protruding members.

15. The load carrier of claim 10, wherein a protective cover is pivotably fastened to the carrier member, the cover being pivotal between an open position allowing access to the clamping device and a closed position preventing access to the clamping device.

16. The load carrier of claim 10, wherein the clamping device includes an operating lever pivotably fastened to a lower end portion of the contact support member, the lever including a cam surface abutting the supporting and fixing element.

17. A foot device for a load carrier, the load carrier including a carrier member extending transversely over a roof of a vehicle, at least one end of the carrier member being fastened to the vehicle by the foot device, the foot device comprising:

a contact support member extending downwardly from an end of the carrier member, the contact support member being substantially rigid relative to the carrier member, the contact support member including an upper mounting portion received in an end portion of the carrier member;

a supporting and fixing element including, at a lower end portion thereof, engagement means for engaging with corresponding engagement means on the vehicle, the supporting and fixing element including, at an upper portion thereof, pivotal connection means for pivotably connecting the supporting and fixing element to at least one of the carrier member and the contact support member such that the supporting and fixing element is pivotable about a substantially horizontal pivot axis that is substantially parallel relative to a longitudinal direction of the vehicle, the upper portion of the supporting and fixing member being adjacent to exterior surfaces of an end portion of the carrier member;

a clamping device on the contact support member for forcing the supporting and fixing element to pivot to a locking position in which the engagement means of the supporting and fixing element engages with the corresponding engagement means on the vehicle and fastens the load carrier to the vehicle, and for releasing the supporting and fixing element and allowing the supporting and fixing element to pivot to an open position in which the engagement means of the supporting and fixing element disengages from the corresponding engagement means on the vehicle, wherein the pivotal connection means includes a pivot pin, and wherein the pivot pin fastens the contact support member to the carrier member.

18. The load carrier of claim 17, further comprising a protective cover pivotal between an open position allowing access to the clamping device and a closed position preventing access to the clamping device, and wherein the pivot pin provides a pivotal connection between the cover and the carrier member.

19. A foot device for a load carrier, the load carrier including a carrier member extending transversely over a roof of a vehicle, at least one end of the carrier member being fastened to the vehicle by the foot device, the foot device comprising:

a first member extending downwardly from the carrier member, the first member being substantially rigid relative to the carrier member, the first member including a clamping device at a lower end thereof, the clamping device including a single actuator;

a second member, the second member being pivotable relative to the carrier member and the first member, the second member including engagement means at a lower end thereof, the single actuator being adapted to move the engagement means laterally toward the vehicle such that the engagement means engages with corresponding engagement means on the vehicle and the single actuator being adapted to release the engagement means such that the engagement means releases the corresponding engagement means and;

a pivot pin for pivotably connecting the second member to the carrier member.

20. The load carrier of claim 19, wherein the second member includes an upper portion adjacent exterior surfaces of an end portion of the carrier member.

21. The load carrier of claim 20, wherein the first member is an integral, downwardly bent end portion of the carrier member.

22. The load carrier of claim 20, wherein the first member includes an upper mounting portion received in an end portion of the carrier member.

23. The load carrier of claim 19, wherein the engagement means includes one or more protruding members disposed at the lower end of the second member and extending substantially horizontally toward the vehicle, and wherein the corresponding engagement means includes corresponding openings on the vehicle for receiving the protruding members.

24. The load carrier of claim 19, further comprising a protective cover pivotably fastened to the carrier member, the cover being pivotal between an open position allowing access to the clamping device and a closed position preventing access to the clamping device.

25. The load carrier of claim 19, wherein the clamping device includes an operating lever pivotably fastened to the lower end of the first member, the lever including a cam surface abutting the second member.

26. A foot device for a load carrier, the load carrier including a carrier member extending transversely over a roof of a vehicle, at least one end of the carrier member being fastened to the vehicle by the foot device, the foot device comprising:

a first member extending downwardly from the carrier member, the first member being substantially rigid relative to the carrier member, the first member including a clamping device at a lower end thereof, the first member including an upper mounting portion received in an end portion of the carrier member;

a second member, the second member being pivotable relative to the carrier member and the first member, the second member including engagement means at a lower end thereof, the second member including an upper portion adjacent exterior surfaces of an end portion of the carrier member, the engagement means being moved laterally toward and away from the vehicle, when the clamping device causes the second member to pivot, such that the engagement means engages with corresponding engagement means on the vehicle and such that the engagement means releases the corresponding engagement means, respectively; and a pivot pin for pivotably connecting the second member to the carrier member and the first member, and wherein the pivot pin fastens the first member to the carrier member.

27. The load carrier of claim 26, further comprising a protective cover pivotably connected to the carrier member by the pivot pin, the protective cover being pivotal between an open position allowing access to the clamping device and a closed position preventing access to the clamping device.

28. A foot device for a load carrier, the load carrier including a carrier member extending transversely over a roof of a vehicle, at least one end of the carrier member being fastened to the vehicle by the foot device, the foot device comprising:

a first member extending downwardly from the carrier member, the first member being substantially rigid relative to the carrier member, the first member including a clamping device, the clamping device including a single actuator;

a second member pivotably connected to at least one of the carrier member or the first member, the single actuator being adapted to move a lower portion of the second member laterally toward the vehicle, the lower portion including engagement means for releasably fastening the load carrier to the vehicle, the engagement means fastening the load carrier to the vehicle when the lower portion is in a position moved toward the vehicle, the single actuator being adapted to release the lower portion to permit the lower portion to be moved to a position away from the vehicle and release the load carrier from the vehicle;

a pivot pin pivotably connecting the second member to the carrier member; and a protective cover pivotably fastened to the load carrier and movable between an open and a closed position, the protective cover preventing operation of the clamping device when the protective cover is in the closed position, and allowing operation of the clamping device when the protective cover is in the open position.

29. The load carrier of claim 28, further comprising a pivot pin for pivotably connecting the second member to an end portion of the carrier member, the pivot pin also connecting the protective cover to the carrier member.

30. The load carrier of claim 28, wherein the engagement means includes one or more protruding members disposed at the lower portion of the second member and extending substantially horizontally toward the vehicle, the engagement means fastening the load carrier to the vehicle by engaging with corresponding engagement means on the vehicle, and wherein the corresponding engagement means includes corresponding openings on the vehicle for receiving the protruding members.

31. The load carrier of claim 28, wherein the clamping device includes an operating lever pivotably fastened to a lower end portion of the first member, the lever including a cam member abutting the second member to cause movement of the lower portion laterally toward and away from the vehicle when the lever is pivoted.

32. A foot device for a load carrier, the load carrier including a carrier member extending transversely over a roof of a vehicle, at least one end of the carrier member being fastened to the vehicle by the foot device, the foot device comprising:

a first member extending downwardly from the carrier member, the first member being substantially rigid relative to the carrier member, the first member including a clamping device;

a second member pivotably connected to at least one of the carrier member or the first member, a lower portion of the second member being movable laterally toward and away from the vehicle by the clamping device when the second member pivots, the lower portion including engagement means for releasably fastening the load carrier to the vehicle, the engagement means fastening the load carrier to the vehicle when the lower portion is in a position moved toward the vehicle and releasing the load carrier from the vehicle when the lower portion is moved to a position away from the vehicle;

a protective cover pivotably fastened to the load carrier and movable between an open and a closed position, the protective cover preventing operation of the clamping device when the protective cover is in the closed position, and allowing operation of the clamping device when the protective cover is in the open position; and a pivot pin for pivotably connecting the second member to an end portion of the carrier member, the pivot pin also connecting the protective cover to the carrier member, wherein the first member includes upper mounting portions received in an end portion of the carrier member, the pivot pin connecting the mounting portions to the carrier member.

* * * * *